(12) United States Patent
Shen et al.

(10) Patent No.: US 12,536,617 B2
(45) Date of Patent: Jan. 27, 2026

(54) FUSED IMAGES BACKGROUNDS (71) Applicants: HEWLETT-PACKARD DEVELOPMENT COMPANY, L.P., Spring, TX (US); PURDUE RESEARCH FOUNDATION, West Lafayette, IN (US)

(72) Inventors: Yezhi Shen, West Lafayette, IN (US); Weichen Xu, West Lafayette, IN (US); Qian Lin, Palo Alto, CA (US); Jan P. Allebach, West Lafayette, IN (US); Fengqing Zhu, West Lafayette, IN (US)

(73) Assignees: Purdue Research Foundation, West Lafayette, IN (US); Hewlett-Packard Development Company, L.P., Spring, TX (US)

( * ) Notice: Subject to any disclaimer, the term of this patent is extended or adjusted under 35 U.S.C. 154(b) by 383 days.

(21) Appl. No.: 17/887,225

(22) Filed: Aug. 12, 2022

(65) Prior Publication Data
US 2024/0054608 A1 Feb. 15, 2024

(51) Int. Cl.
G06T 7/194 (2017.01)
G06T 5/50 (2006.01)
G06T 7/20 (2017.01)

(52) U.S. Cl.
CPC ............... *G06T 5/50* (2013.01); *G06T 7/194* (2017.01); *G06T 7/20* (2013.01); *G06T 2207/20221* (2013.01)

(58) Field of Classification Search
CPC .. G06T 5/50; G06T 7/194; G06T 7/20; G06T 2207/20221; G06T 5/70; G06T 7/11; G06T 2207/10016; G06T 2207/30196
See application file for complete search history.

(56) References Cited

U.S. PATENT DOCUMENTS 5,914,748 A * 6/1999 Parulski ................. H04N 5/272 348/241
6,141,435 A * 10/2000 Naoi ....................... G06T 7/254 382/104

(Continued)

FOREIGN PATENT DOCUMENTS

CN 110232326 A 9/2019

OTHER PUBLICATIONS

A machine translated English version of document CN 110232326 (Year: 2019).

(Continued)

*Primary Examiner* — Aaron W Carter
(74) *Attorney, Agent, or Firm* — Quarles & Brady LLP (57) ABSTRACT In some examples in accordance with the present description, an electronic device is provided. The electronic device includes an image sensor and a controller. The controller is to receive multiple images from the image sensor including respective foregrounds and backgrounds. The controller is also to segment the respective foregrounds from the backgrounds. The controller is also to combine the backgrounds to form a fused background. The controller is also to receive a new image including a new image foreground and a new image background. The controller is also to segment the new image foreground from the new image background.

20 Claims, 9 Drawing Sheets

(56) References Cited

U.S. PATENT DOCUMENTS

| | | | | |
|---|---|---|---|---|
| 6,184,858 | B1* | 2/2001 | Christian | G06V 10/28 348/E9.037 |
| 6,430,303 | B1* | 8/2002 | Naoi | G06T 7/254 382/104 |
| 6,546,115 | B1* | 4/2003 | Ito | G08B 13/19691 348/169 |
| 7,783,075 | B2* | 8/2010 | Zhang | H04N 7/147 382/173 |
| 8,073,247 | B1* | 12/2011 | Sandrew | G06T 11/001 382/167 |
| 9,078,048 | B1* | 7/2015 | Gargi | H04N 21/2668 |
| 10,121,229 | B2* | 11/2018 | Gray | G06V 40/16 |
| 10,311,579 | B2* | 6/2019 | Yun | G06V 10/28 |
| 11,276,177 | B1* | 3/2022 | Tsai | G06T 7/174 |
| 2003/0090751 | A1* | 5/2003 | Itokawa | H04N 19/51 358/538 |
| 2004/0151342 | A1* | 8/2004 | Venetianer | G06T 7/143 382/199 |
| 2006/0285747 | A1* | 12/2006 | Blake | G06T 7/162 382/180 |
| 2007/0133880 | A1* | 6/2007 | Sun | G06T 7/11 382/195 |
| 2007/0286520 | A1* | 12/2007 | Zhang | H04N 7/147 382/173 |
| 2009/0087096 | A1* | 4/2009 | Eaton | G06V 10/28 382/190 |
| 2011/0285748 | A1 | 11/2011 | Slatter et al. | |
| 2012/0050323 | A1* | 3/2012 | Baron, Jr. | H04L 12/1818 345/632 |
| 2012/0140066 | A1* | 6/2012 | Lin | G06T 7/254 348/143 |
| 2012/0207345 | A1* | 8/2012 | Tang | B60K 35/10 382/103 |
| 2012/0327172 | A1* | 12/2012 | El-Saban | G06T 7/174 348/14.02 |
| 2013/0101208 | A1* | 4/2013 | Feris | G06V 20/46 382/164 |
| 2014/0003720 | A1* | 1/2014 | Seow | G06T 7/254 382/173 |
| 2014/0132789 | A1* | 5/2014 | Koyama | G06T 3/4038 348/218.1 |
| 2015/0003675 | A1* | 1/2015 | Nakagami | G06V 20/52 382/103 |
| 2015/0221066 | A1* | 8/2015 | Kobayashi | G06T 11/00 382/284 |
| 2015/0310297 | A1* | 10/2015 | Li | G06V 20/54 382/199 |
| 2016/0125268 | A1* | 5/2016 | Ebiyama | G06V 20/52 382/218 |
| 2017/0161905 | A1* | 6/2017 | Reyzin | G06T 7/194 |
| 2017/0263037 | A1* | 9/2017 | Maruyama | G06T 11/00 |
| 2017/0330050 | A1* | 11/2017 | Baltsén | G06F 16/51 |
| 2017/0358094 | A1* | 12/2017 | Sun | G06T 7/11 |
| 2018/0144476 | A1* | 5/2018 | Smith | G06T 7/174 |
| 2018/0255326 | A1* | 9/2018 | Oya | H04N 21/4405 |
| 2018/0365809 | A1* | 12/2018 | Cutler | H04N 7/142 |
| 2019/0052868 | A1* | 2/2019 | Na | H04N 21/2365 |
| 2019/0104253 | A1* | 4/2019 | Kawai | G06T 3/4038 |
| 2019/0180107 | A1* | 6/2019 | Pham | G06V 10/454 |
| 2019/0347776 | A1* | 11/2019 | Chou | H04N 23/741 |
| 2020/0273152 | A1* | 8/2020 | Lin | G06T 5/20 |
| 2020/0402243 | A1* | 12/2020 | Benou | G06T 7/11 |
| 2021/0004943 | A1* | 1/2021 | Fukasawa | G06T 15/20 |
| 2021/0166399 | A1* | 6/2021 | Stephens | G06T 11/60 |
| 2021/0209734 | A1 | 7/2021 | Simhadri et al. | |
| 2021/0243383 | A1* | 8/2021 | Huang | G06V 10/806 |
| 2022/0109838 | A1* | 4/2022 | Guruva Reddiar | H04N 19/119 |
| 2022/0215531 | A1 | 7/2022 | Azernikov et al. | |
| 2022/0256116 | A1* | 8/2022 | Chu | H04N 7/147 |
| 2023/0014805 | A1* | 1/2023 | Verma | G06T 7/248 |
| 2023/0026038 | A1* | 1/2023 | Iwakiri | H04N 13/117 |
| 2023/0044969 | A1 | 2/2023 | Yang et al. | |
| 2023/0063678 | A1* | 3/2023 | Janus | H04N 9/643 |
| 2023/0224582 | A1* | 7/2023 | Awasthi | G06T 7/246 348/208.4 |
| 2024/0029472 | A1* | 1/2024 | Shen | G06V 10/82 |
| 2024/0031517 | A1* | 1/2024 | Liu | H04N 5/144 |
| 2024/0054608 | A1* | 2/2024 | Shen | G06T 5/70 |
| 2024/0104742 | A1* | 3/2024 | Xu | G06T 7/33 |
| 2024/0153038 | A1* | 5/2024 | Duan | G06T 11/60 |
| 2024/0404017 | A1* | 12/2024 | Xiang | G06T 5/60 |

OTHER PUBLICATIONS

Howard, Andrew et al, "Searching for MobileNetV3", arXiv:1905.02244v5, Nov. 20, 2019, 11 pages.

Mingyang et al, "An End-to-End Atrous Spatial Pyramid Pooling and Skip-Connections Generative Adversarial Segmentation Network for Building Extraction from High-Resolution Aerial Images", vol. 12, 5151, Applied Sciences, May 20, 2022, pp. 1-21.

Goswami, G., et al., "RGB-D face recognition with texture and attribute features.", IEEE Transactions on Information Forensics and Security, vol. 9, No. 10, 2014, pp. 1629-1640.

Jiang, L., et al., "Robust RGB-D face recognition using attribute-aware loss.", IEEE transactions on pattern analysis and machine intelligence, vol. 42, No. 10, Oct. 2020, pp. 2552-2566.

* cited by examiner

*Empty Fused_Background*

*Empty Background_Mask*

*While new Frame and Segmentation_Mask comes in:*

*Current_Background = Frame times Segmentation_Mask*

*If STITCH_ENABLE:*

*Aligned_Fused_Background, Aligned_Background_Mask = ImageStitching(Fused_Background, Current_Background, Background_Mask)*

*Add_Mask = (Segmentation_Mask & Aligned_Background_Mask)*

*Add_Background =*

*Aligned_Fused_Background times Add_Mask*

*Fused_Background = Add_Background + Current_Background*

*Background_Mask = Segmentation_Mask + Add_Mask*

*else*

*Add_Mask = (Segmentation_Mask & Background_Mask)*

*Add_Background = Fused_Background times Add_Mask*

*Fused_Background = Add_Background + Current_Background*

*Background_Mask = Segmentation_Mask + Add_Mask*

FUSED IMAGES BACKGROUNDS

BACKGROUND

Electronic devices such as desktops, laptops, notebooks, tablets, and smartphones include executable code that enables users to perform video conferencing. During video conferencing sessions, video may be captured by a user's device and transmitted to a viewer's device in substantially real time (e.g., accounting for transmission lag but not having a delay to allow any meaningful amount of processing to be performed). Some video conferencing experiences enable the virtual modification of a user's background, such as via blurring of the user's background.

BRIEF DESCRIPTION OF THE DRAWINGS

Various examples will be described below referring to the following figures.

DETAILED DESCRIPTION

As described above, electronic devices such as desktops, laptops, notebooks, tablets, and smartphones include executable code that enables users to perform video conferencing. During video conferencing sessions, video may be captured by a user's device and transmitted to a viewer's device in substantially real time (e.g., accounting for transmission lag but not having a delay to allow any meaningful amount of processing to be performed). Some video conferencing experiences enable the virtual modification of a user's background, such as via blurring of the user's background.

Some background blur techniques utilize spatial processing that may cause a visual effect of a halo to form around the foreground subject. The halo may result, for example, from a lack of knowledge by the electronic device of visual information of the background in an area obstructed from view by the foreground and the resultant effect on generation of a matte for separating the foreground from the background.

To increase a quality of background blurring, a fused background may be determined. For example, in some video conferencing environments the background remains stationary or substantially stationary. However, a user (e.g., foreground) may change positions. As the user changes positions, the portion of the background that is visible also changes. To perform the background fusion, the electronic device may determine a first background of an image at a particular point in time (e.g., t). At a subsequent point in time (e.g., t+n, n>0), the electronic device may again determine a second background of a subsequently captured image. The electronic device may then combine the first background and the second background to form a fused background. The fused background may be further augmented or refined according to any suitable number of determined backgrounds, such as a programmed number of backgrounds, a number of backgrounds determined in a given time period, etc., until a full background (e.g., the background as it would appear if the user of foreground were absent from the image) is reconstructed, until a percentage of the full background is reconstructed, or the like. In at least some examples, determination of a fused background and synthesizing an image that includes a segmented foreground and a blurred representation of the fused background increases a user experience by improving a quality of the resulting image, reducing the appearance of a halo effect around the segmented foreground.

In some examples in accordance with the present description, an electronic device is provided. The electronic device includes an image sensor and a controller. The controller is to receive multiple images from the image sensor including respective foregrounds and backgrounds. The controller is also to segment the respective foregrounds from the backgrounds. The controller is also to combine the backgrounds to form a fused background. The controller is also to receive a new image including a new image foreground and a new image background. The controller is also to segment the new image foreground from the new image background.

In some examples in accordance with the present description, an electronic device is provided. The electronic device includes a controller. The controller is to receive a first image and a first mask identifying a first foreground and a first background of the first image. The controller is also to form a second mask that combines the first mask with a third mask. The controller is also to form a first background by applying the second mask to a fused background. The controller is also to form a second background by applying the first mask to the first image. The controller is also to refine the fused background to include the first background and the second background. The controller is also to refine the third mask to include the first mask and the second mask.

In some examples in accordance with the present description, a non-transitory computer-readable medium storing machine-readable instructions is provided. The instructions, when executed by a controller of an electronic device, cause the controller to: receive first and second images including respective first and second foregrounds and first and second backgrounds, combine the first and second backgrounds to form a first fused background, process the first fused background to blur the first fused background, and provide an image for transmission including the second foreground and the blurred first fused background.

Figure 1:
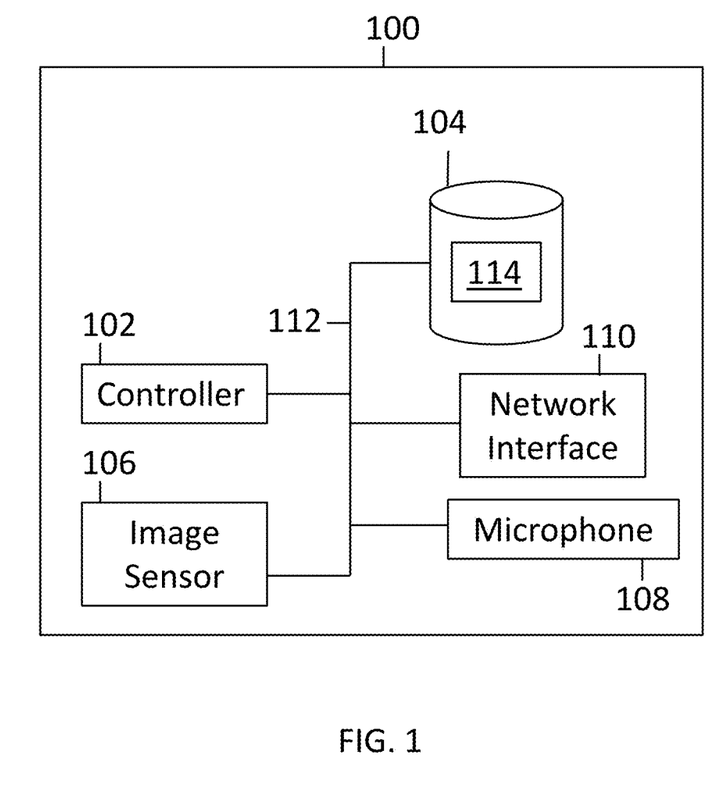
FIG. 1 is a block diagram of an electronic device in accordance with various examples.

FIG. 1 is a block diagram of an electronic device 100 in accordance with various examples. The electronic device 100 may be a laptop computer, a desktop computer, a notebook, a tablet, a server, a smartphone, or any other suitable electronic device having a camera and capable of participating in video conferencing sessions. The electronic device 100 may include a controller 102 (e.g., a central processing unit (CPU), a microprocessor, etc.), a storage 104 (e.g., random access memory (RAM), read-only memory (ROM)), an image sensor 106 (e.g., a camera) to capture images and video in an environment of the electronic device 100, a microphone 108 to capture audio in an environment of the electronic device 100, and a network interface 110. The network interface 110 enables the controller 102, the image sensor 106, and/or the microphone 108 to communicate with other electronic devices external to the electronic device 100. For example, the network interface 110 enables the controller 102 to transmit signals to and receive signals from another electronic device over the Internet, a local network, etc., such as during a video conferencing session. A bus 112 may couple the controller 102, storage 104, image sensor 106, microphone 108, and network interface 110 to each other. Storage 104 may store executable code 114 (e.g., an operating system (OS)) and executable code 114 (e.g., an application, such as a video conferencing application that facilitates video conferencing sessions with electronic devices via the network interface 110). In examples, the image sensor 106 may capture and store images and/or video (which is a consecutive series of images, or image frames) to the storage 104. In examples, the microphone 108 may capture and store audio to the storage 104. In examples, the storage 104 includes buffers (not shown) to temporarily store image and/or video captured by the image sensor 106 and/or audio captured by the microphone 108 prior to transmission via the network interface 110 or manipulation by the controller 102.

In operation, the controller 102 executes the executable code 114 to participate in a video conferencing session. As the controller 102 executes the executable code 114, the controller 102 receives images and/or video captured by the image sensor 106 and/or audio captured by the microphone 108 and provides the image, video, and/or audio data to the network interface 110 for transmission to another electronic device that is participating in the video conferencing session with the electronic device 100.

As described above, a user of the electronic device 100 may be participating in the video conferencing session and may wish to alter a background of the video conferencing session. To perform such alteration, object segmentation is performed to separate a foreground subject of the video conferencing session from the background of the video conferencing session. However, challenges can arise in circumstances such as blurring the background, leading to a halo effect surrounding the foreground. The halo effect is a visually perceptible line that varies from surrounding lines, such as being brighter, having a different amount of blur, or having some other characteristic(s) causing the line to be an area of high contrast with respect to the foreground and the background. To mitigate these challenges, background reconstruction may be performed to determine a digital approximation for the background, or a portion of the background, in the absence of the foreground. In this way, the halo effect, if present, may be hidden behind the foreground, rather than surrounding the foreground, or the halo effect may be fully mitigated and therefore prevented.

To reconstruct the background, a fused background is formed. The fused background includes data (e.g., red-green-blue (RGB) data) from multiple individual images or frames. For example, the background may include data captured by the image sensor 106 at time t, at time t+n, at time t+m, etc., where n and m are each nonzero positive numbers and m is greater than n. It is assumed that during the interval of time n, and again during the interval of time m, some amount of movement may have occurred, such as movement of the foreground subject, movement of the image sensor 106, or the like. This results in different portions of the background being visible at time t+n than at time t and at time t+m than at time t or t+n.

The controller 102 may obtain the background image for multiple points in time (e.g., t, t+n, t+m, etc.) and perform segmentation to separate the foreground of the image from the background of the image. Each successively determined background may be merged with a previously stored background to form a fused background, which is in turn is used as the previously stored background in a next iteration of the merging.

The controller 102 may store the fused background and synthesize a video stream for use in the video conferencing session based on the fused background. For example, the controller 102 may perform any suitable form of processing on the fused background to blur or otherwise manipulate the fused background and overlay a segmented foreground image on top of the manipulated fused background to form the video stream for use in the video conferencing session, such as for transmission by the network interface 110. In at least some examples, such use of the fused background mitigates the formation of a halo effect around the foreground in the video stream.

In some examples, a perspective or camera angle of images received by the controller 102 may differ. In such examples, the images may not be directly combinable with each other, or with an existing fused background, to form a new fused background. In such examples, the images may be aligned according to any suitable process, such as image stitching, to facilitate the formation of a fused background, as described above.

Figure 2:
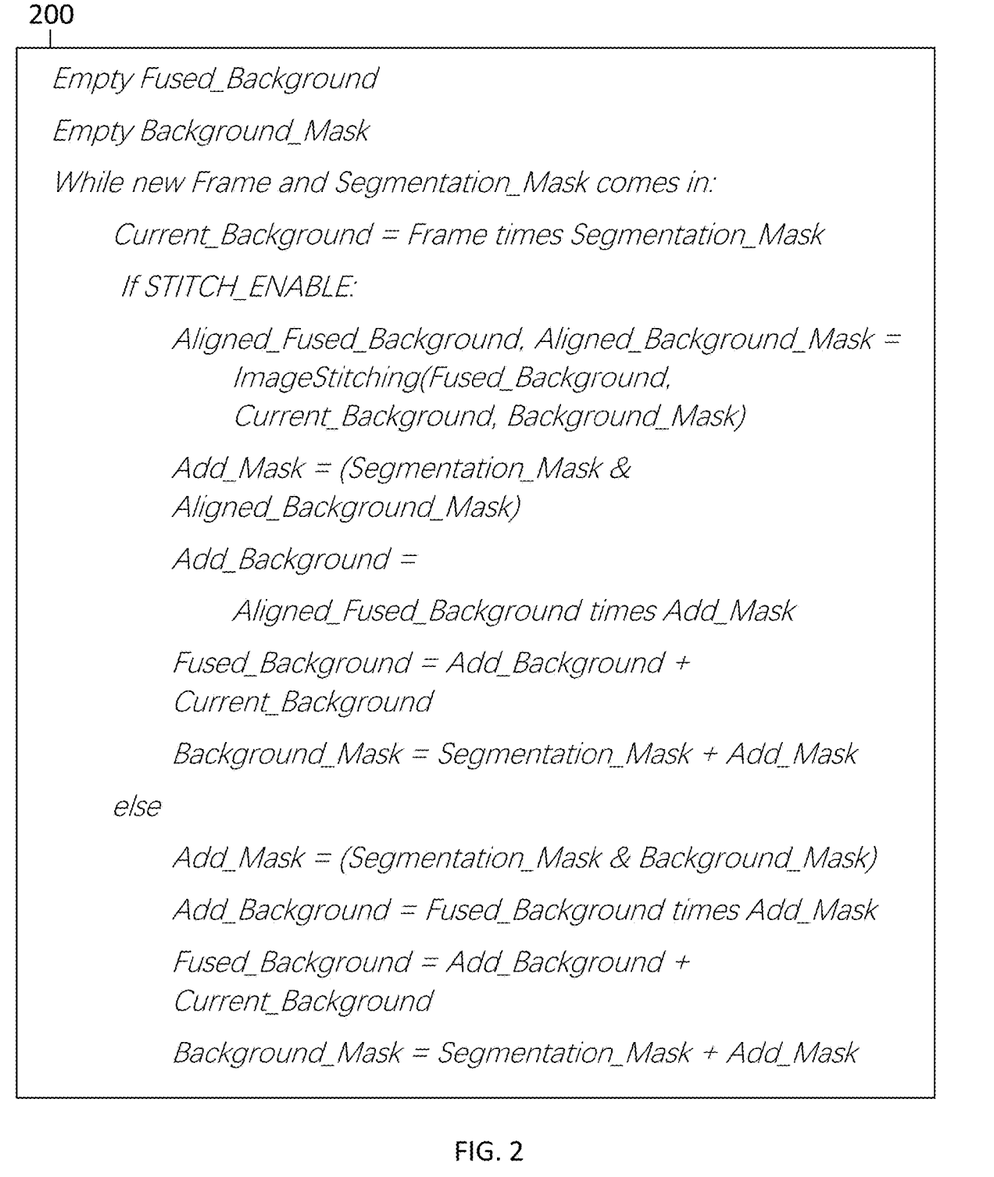
FIG. 2 is a diagram of pseudocode in accordance with various examples.

FIG. 2 is a diagram of pseudocode 200 in accordance with various examples. The pseudocode 200 may be representative of operations to be performed by the controller 102 to form and/or use a fused background, as described herein. For example, the pseudocode 200 may be a plain-language description of operations that may be performed by the controller 102 based on machine-executable instructions (e.g., the executable code 114) stored to the storage 104 and executed by the controller 102 in response to receipt of a request from the user to manipulate a background of an image or video for a video conferencing session.

The pseudocode 200 begins with the controller 102 initializing, resetting, or otherwise emptying variables for a Fused_Background and a Background_Mask. For each new Frame of image data and Segmentation_Mask obtained by the controller 102, the controller 102 executes an operational loop. The Segmentation_Mask is a mask that indicates which portions of the Frame are foreground elements and which portions of the frame are background elements. The loop begins with combining the Frame and the Segmentation_Mask, such as by multiplying the Frame by the Segmentation_Mask. The loop next progresses through one of two branches of operation.

In the first branch, if image stitching is enabled, an Aligned_Fused_Background and an Aligned_Background_Mask are determined. In an example, the Aligned_Fused_Background is determined by performing image stitching between the Fused_Background and the Current_Background. The image stitching may be performed according to any suitable image stitching or alignment process, the scope of which is not limited herein, to align perspectives of the Fused_Background and the Current_Background based on elements present in both the Fused_Background and the Current_Background. In an example, the Aligned_Background_Mask is determined by applying a same warping or transformation to the Background_Mask as is applied to the Fused_Background in the image stitching. After determining the Aligned_Fused_Background and the Aligned_Background_Mask, the first branch continues with forming an Add_Mask by merging (e.g., such as by performing a logical AND operation) the Aligned_Background_Mask and the Segmentation_Mask. The first branch continues with forming an Add_Background by merging the Aligned_Fused_Background with the Add_Mask, such as by multiplying the Aligned_Fused_Background by the Add_Mask. The first branch continues with forming the Fused_Background by merging the Add_Background and the Current_Background (e.g., such as by performing a logical OR operation) and forming the Background_Mask by merging the Segmentation_Mask and the Add_Mask (e.g., such as by performing a logical OR operation).

In the second branch, if image stitching is not enabled, an Add_Mask is formed by merging (e.g., such as by performing a logical AND operation) the Background_Mask and the Segmentation_Mask. The second branch continues with forming an Add_Background by merging the Fused_Background with the Add_Mask, such as by multiplying the Fused_Background by the Add_Mask. The second branch continues with forming the Fused_Background by merging the Add_Background and the Current_Background (e.g., such as by performing a logical OR operation) and forming the Background_Mask by merging the Segmentation_Mask and the Add_Mask (e.g., such as by performing a logical OR operation).

Figure 3:
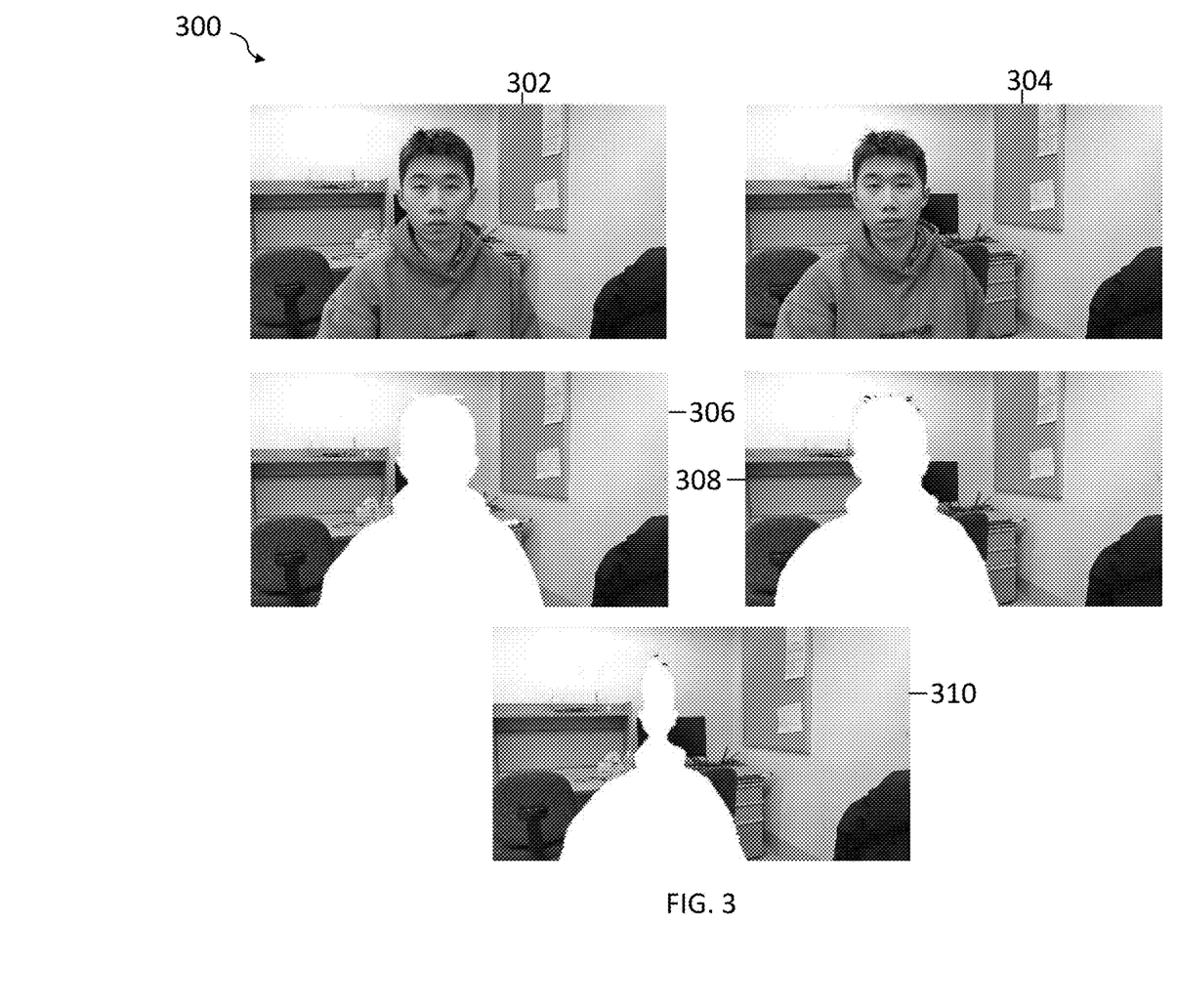
FIG. 3 is a pictographical representation of a background fusion process in accordance with various examples.

FIG. 3 is a pictographical representation 300 of a background fusion process in accordance with various examples. The background fusion process represented in FIG. 3 is one in which a camera viewpoint remains stationary and a foreground subject captured by the camera moves, for example. The representation 300 includes images 302, 304, 306, 308, and 310. The image 302 represents the RGB data obtained from the image sensor 106 at time t. The image 304 represents the RGB data obtained from the image sensor 106 at time t+n. The image 306 represents a masked background at time t. The image 308 represents the masked background at time t+n. The image 310 represents a fused background, formed from the images 306, 308. As can be seen by comparing the image 310 to the images 306, 308, a greater percentage of the background is visible in the image 310 than is visible in either of the images 306, 308 individually. This increase in background visibility aids in mitigating the formation of a halo effect around the foreground when the background of the image is manipulated, such as blurred, for use in a video conferencing session.

Figure 4A:
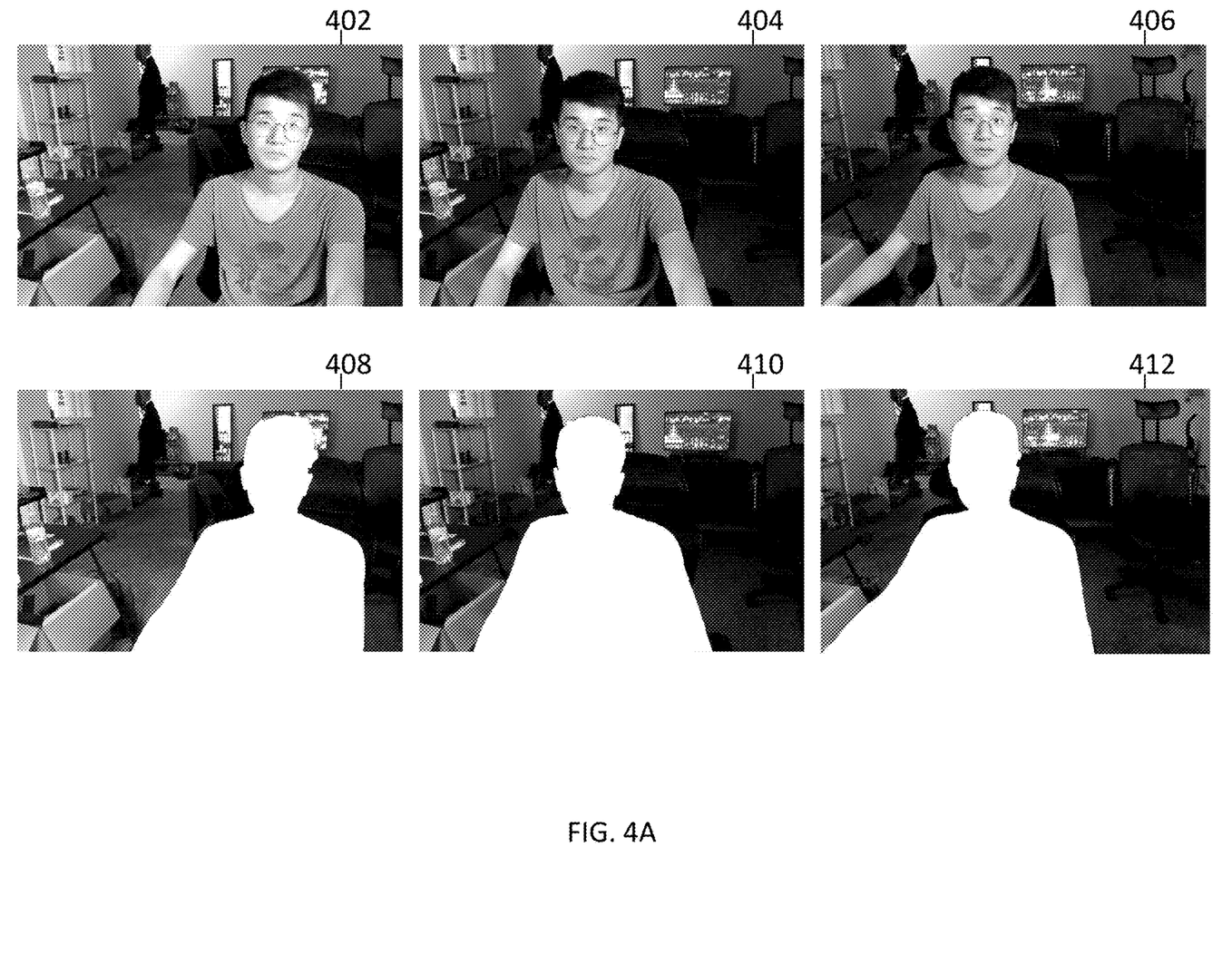
FIGS. 4A and 4B are pictographical representations of a background fusion process in accordance with various examples.
Figure 4B:
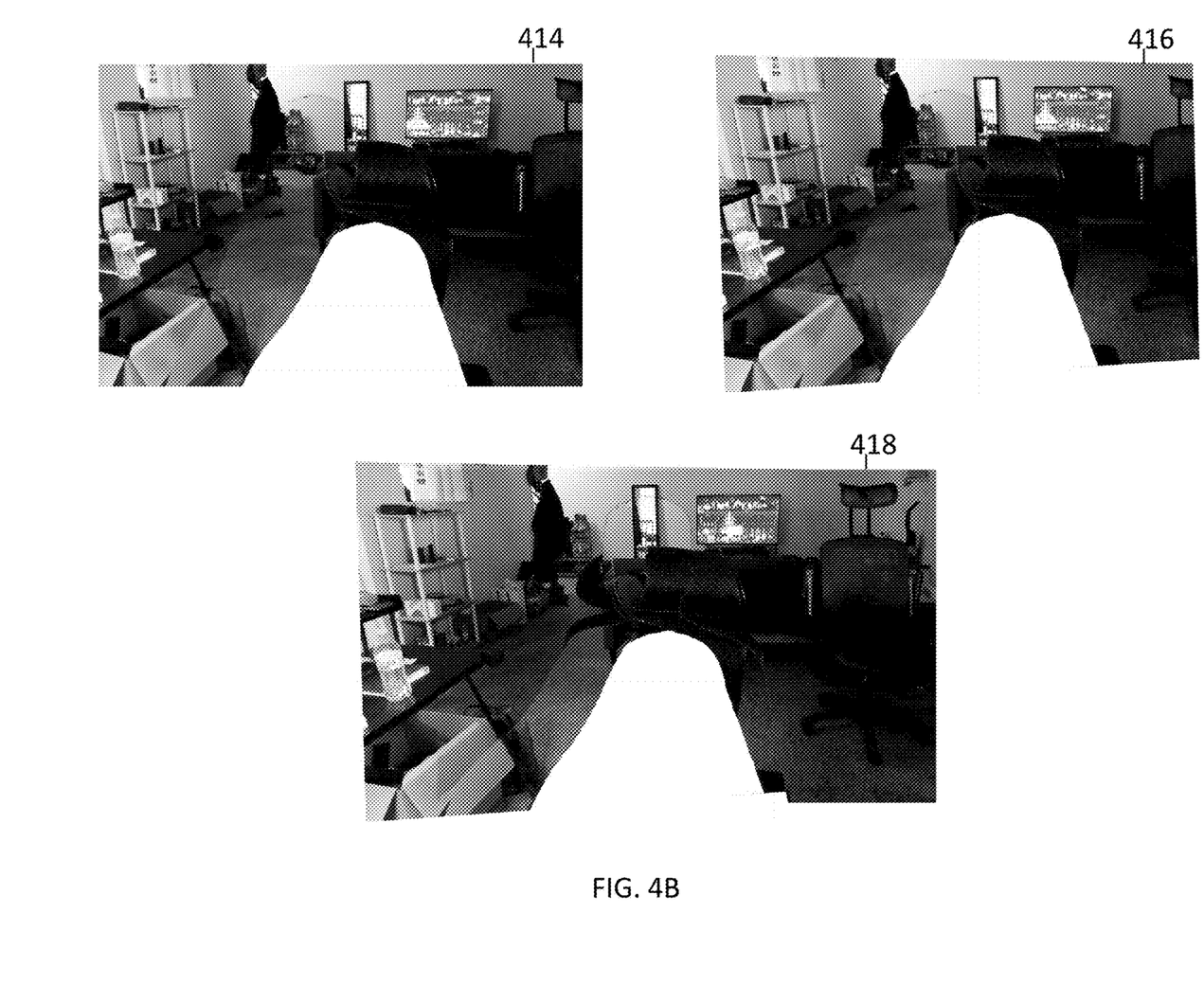

FIGS. 4A and 4B are pictographical representations of a background fusion process in accordance with various examples. The background fusion process represented in FIGS. 4A and 4B is one in which a camera viewpoint remains and a foreground subject captured by the camera each move, for example. FIG. 4A includes images 402, 404, 406, 408, 410, and 412. The image 402 represents the RGB data obtained from the image sensor 106 at time t. The image 404 represents the RGB data obtained from the sensor 106 at time t+1. The image 406 represents the RGB data obtained from the sensor 106 at time t+2. The image 408 represents a masked background at time t. The image 410 represents the masked background at time t+1. The image 412 represents the masked background at time t+2. As can been seen by comparing the images 402, 404 to the image 406, or the images 408, 410 to the image 412, both a location of a foreground object of the images (e.g., the user) and a viewpoint of the camera (e.g., a camera angle or position) have been changed. As a result, while the images 408, 410 may be directly combined to form a fused background, they may not be directly combinable with the image 412 resulting from the change in camera viewpoint.

FIG. 4B includes images 414, 416, and 418. The image 414 represents a fused background, formed from the images 408, 410. The image 416 represents the image 414 warped with a stitching matrix to align features of the image 414 with corresponding features of the image 412. The image 418 represents a second fused background, formed from the images 412, 416. As can be seen by comparing the image 418 to the images 402, 404, 406, a greater percentage of the background is visible in the image 418 than is visible in any of the images 402, 404, 406 individually. This increase in background visibility aids in mitigating the formation of a halo effect around the foreground when the background of the image is manipulated, such as blurred, for use in a video conferencing session. As can further be seen, based on the stitching matrix warping, backgrounds from the images 402, 404, 406 are combinable despite the image 406 being from a different camera viewpoint (e.g., angle, position, perspective, etc.) than the images 402, 404.

Figure 5:
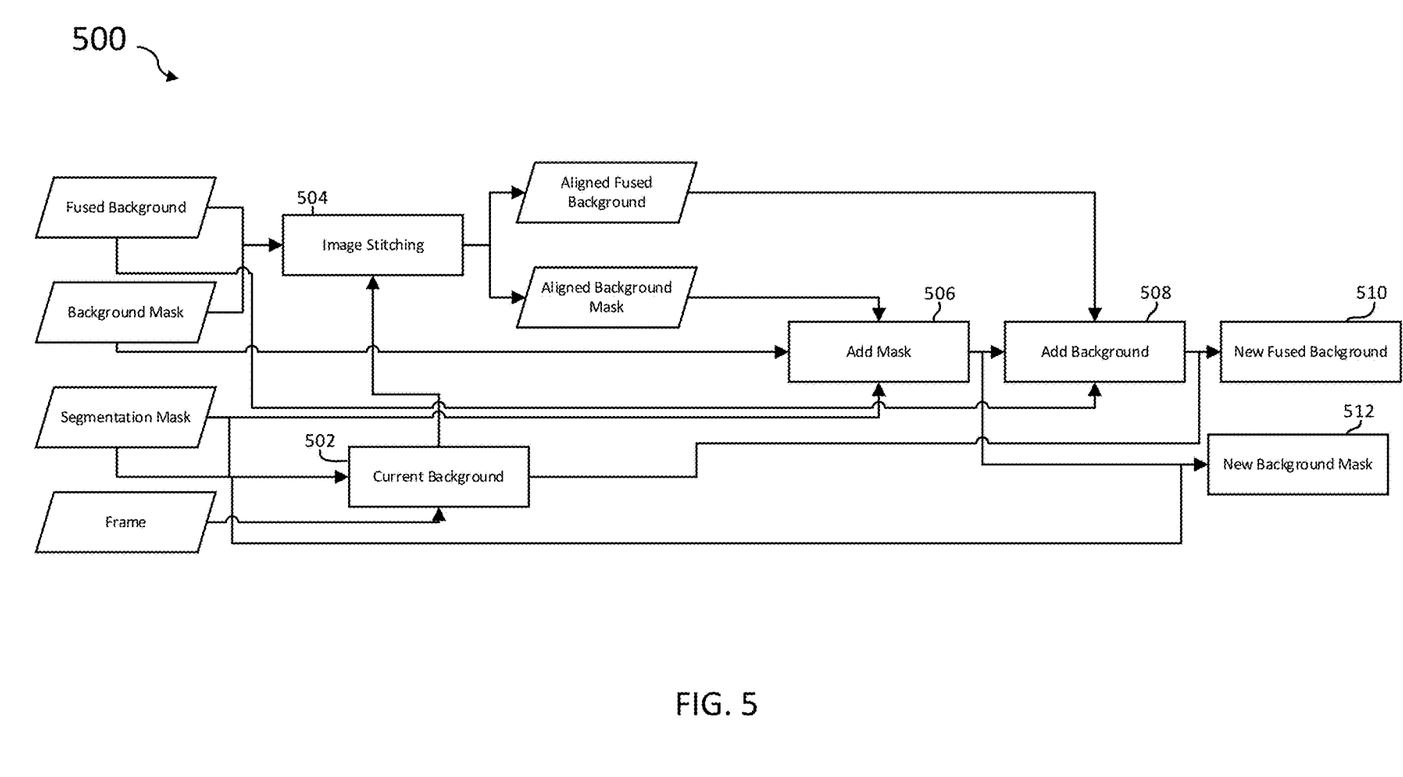
FIG. 5 is a flow diagram of a method in accordance with various examples.

FIG. 5 is a flow diagram of a method 500 in accordance with various examples. In some examples, the method 500 is implemented by the controller 102, such as to form fused image backgrounds, as described herein. The controller 102 may perform or execute the method 500 as a result of executing the executable code 114, for example. The method 500 receives as inputs a fused background image, a background mask, a new mask, and an RGB frame. The method 500 includes determining a current background by applying the segmentation mask to the RGB frame (502). In examples, the determining is performed by multiplying the RGB frame by the segmentation mask. In some examples, the method 500 includes an image stitching operation (504). The image stitching is performed according to any suitable image stitching or alignment process to produce an aligned fused background and an aligned background mask, as described above, based on the fused background, background mask, and current background. In other examples, the operation 504 is omitted. The method 500 includes combining the background mask, or the aligned background mask in implementations of the method 500 including operation 504, and the segmentation mask to form an add mask (506). In examples, the combining is performed by performing an AND logical operation between the background mask, or the aligned background mask, and the segmentation mask. The method 500 also includes applying the add mask to the fused background, or the aligned fused background in implementations of the method 500 including operation 504, to form an add background (508). In examples, applying the add mask to the fused background includes multiplying the fused background by the add mask. The method 500 also includes determining a new fused background by combining the add background with the current background (510). In examples, the new fused background is determined by performing an OR logical operation between the current background and the add background. The method 500 also includes forming a new background mask by combining the add mask and the new mask (512). In examples, the combining is performed by performing an OR logical operation between the add mask and the new mask. The new fused background resulting from operation 510 and the new background mask resulting from operation 512, of a same iteration of the method 500, are the fused background and the background mask data inputs for a next subsequent iteration of the method 500.

The method 500 is implemented by machine-readable instructions (e.g., the executable code 114) stored to a storage device (e.g., the storage device 104) of an electronic device (e.g., the electronic device 100), in various examples. A processor (e.g., the controller 102) of the electronic device executes the machine-readable instructions to perform the method 500, for example. Unless infeasible, some or all of the method 500 may be performed concurrently or in different sequences. For example, the processor performs a block that occurs responsive to a command sequential to the block describing the command. In another example, the processor performs a block that depends upon a state of a component after the state of the component is enabled or disabled.

Figure 6:
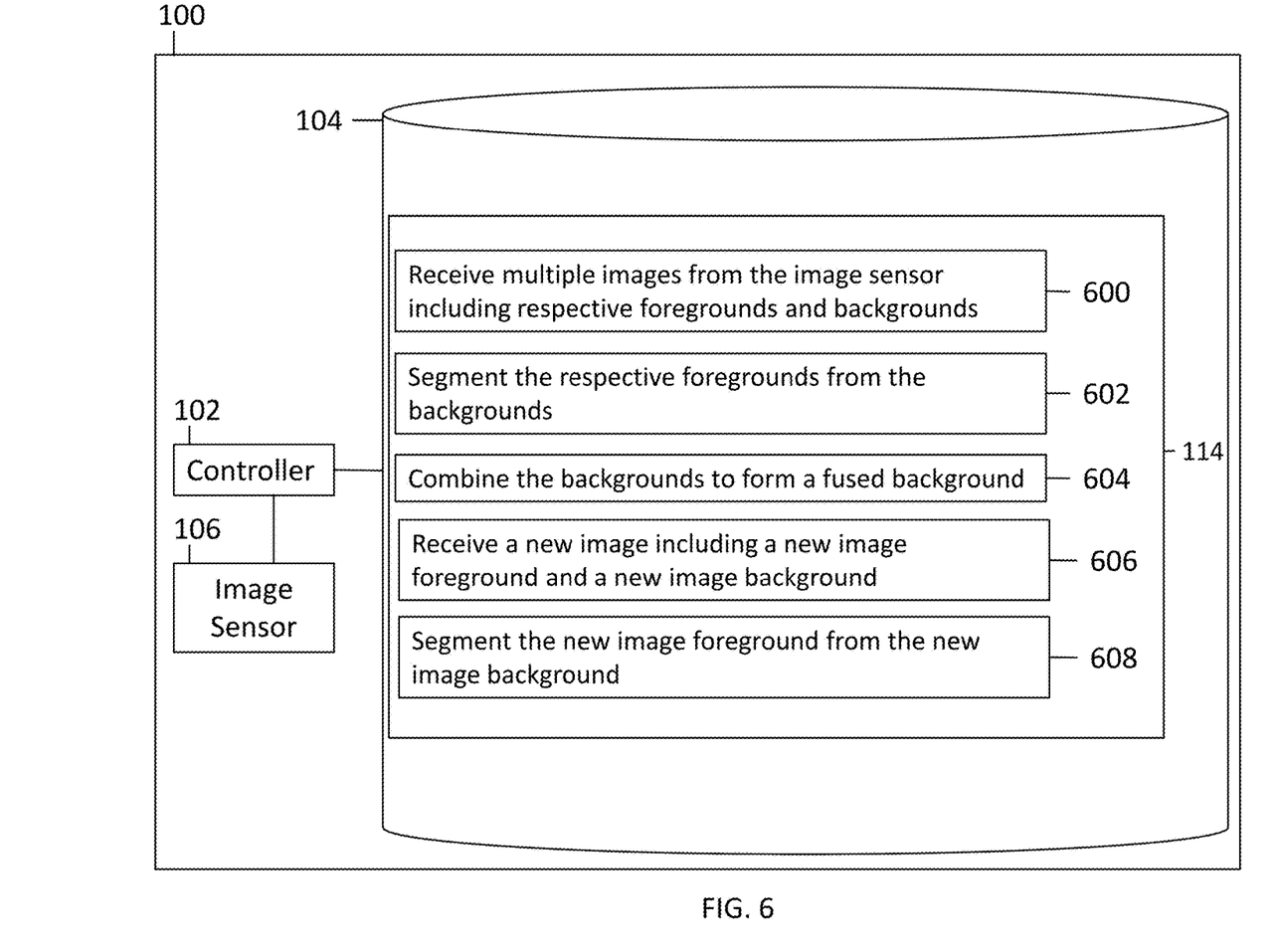
FIGS. 6 and 7 are block diagrams of an electronic device in accordance with various examples.
Figure 7:
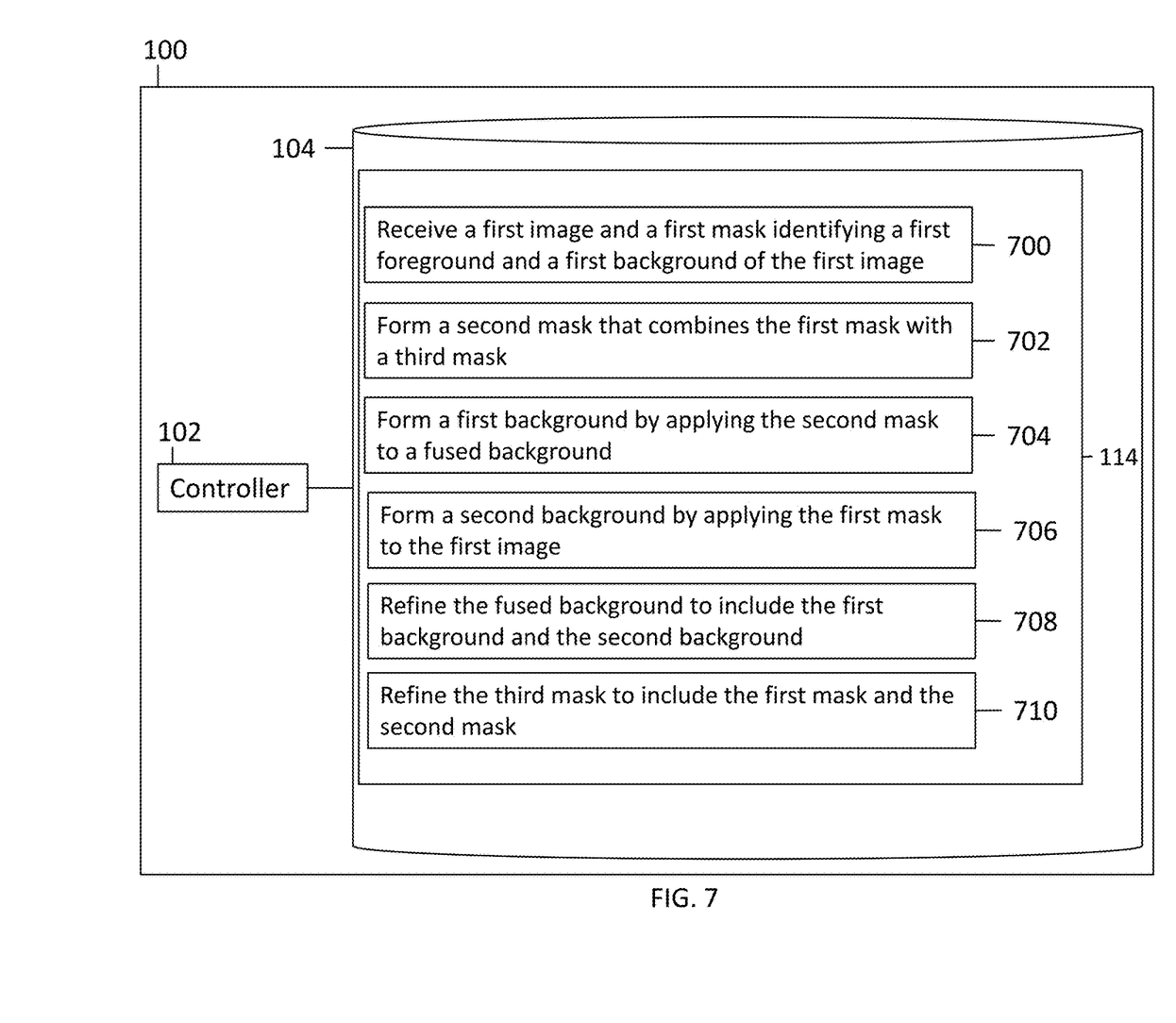

FIGS. 6 and 7 are block diagrams of the electronic device 100, including the controller 102 coupled to the storage 104, in accordance with various examples. Specifically, FIG. 6 shows an example of the electronic device 100, including the controller 102 coupled to the storage 104 along with image sensor 106 coupled to the controller 102. The storage 104 stores executable instructions (e.g., such as part of the executable code 114) that may be executed by the controller 102. The storage 104 includes executable instruction 600, which causes the controller 102 to receive multiple images including respective foregrounds and backgrounds. The storage 104 includes executable instruction 602, which causes the controller 102 to segment the respective foregrounds from the backgrounds. The storage 104 includes executable instruction 604, which causes the controller 102 to combine the backgrounds to form a fused background. The storage 104 includes executable instruction 606, which causes the controller 102 to receive a new image including a new image foreground and a new image background. The storage 104 includes executable instruction 608, which causes the controller 102 to segment the new image foreground from the new image background. The storage 104 includes executable instruction 610, which causes the controller 102 to synthesize an image including the new image foreground and a blurred representation of the fused background.

FIG. 7 shows an example of the electronic device 100, including the controller 102 coupled to the storage 104. The storage 104 stores executable instructions (e.g., such as part of the executable code 114) that may be executed by the controller 102. The storage 104 includes executable instruction 700, which causes the controller 102 to receive a first image and a first mask identifying a first foreground and a first background of the first image. The storage 104 includes executable instruction 702, which causes the controller 102 to form a second mask that combines the first mask with a third mask. The storage 104 includes executable instruction 704, which causes the controller 102 to form a first background by applying the second mask to a fused background. The storage 104 includes executable instruction 706, which causes the controller 102 to form a second background by applying the first mask to the first image. The storage 104 includes executable instruction 708, which causes the controller 102 to refine the fused background to include the first background and the second background. The storage 104 includes executable instruction 710, which causes the controller 102 to refine the third mask to include the first mask and the second mask.

Figure 8:
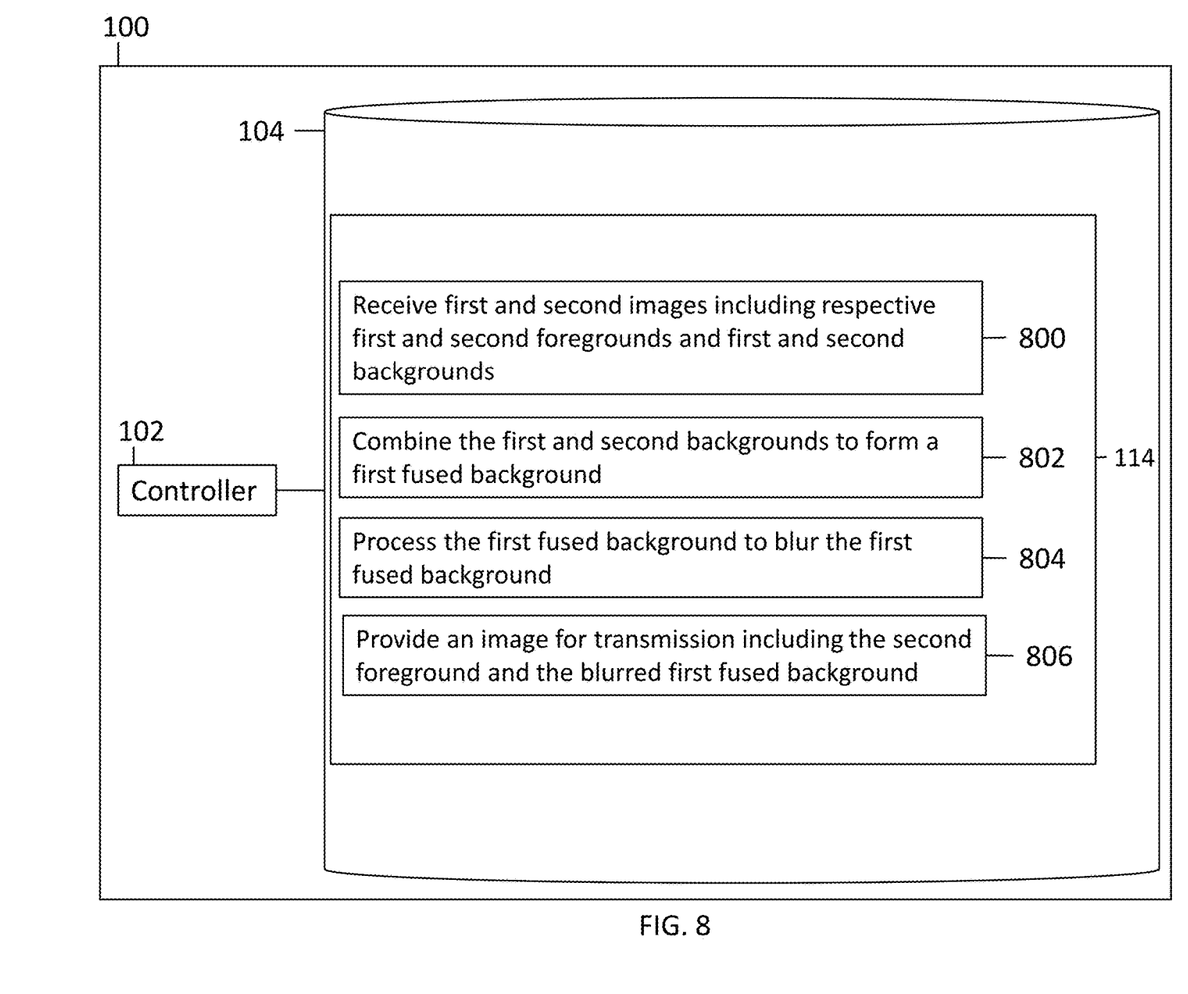
FIG. 8 is a block diagram of non-transitory, computer-readable media in accordance with various examples.

FIG. 8 is a block diagram of non-transitory, computer-readable media in accordance with various examples. Specifically, FIG. 8 depicts an example of the electronic device 100, including the controller 102 coupled to the storage 104. The storage 104 stores executable instructions (e.g., such as part of the executable code 114) that may be executed by the controller 102. The storage 104 includes executable instruction 800, which causes the controller 102 to receive first and second images including respective first and second foregrounds and first and second backgrounds. The storage 104 includes executable instruction 802, which causes the controller 102 to combine the first and second backgrounds to form a first fused background. The storage 104 includes executable instruction 804, which causes the controller 102 to process the first fused background to blur the first fused background. The storage 104 includes executable instruction 806, which causes the controller 102 to provide an image for transmission including the second foreground and the blurred first fused background.

As described herein, executable code includes an "application," "software," and "firmware. The terms "application," "software," and "firmware" are considered to be interchangeable in the context of the examples provided. "Firmware" is considered to be machine-readable instructions that a processor of the electronic device executes prior to execution of the operating system (OS) of the electronic device, with a small portion that continues after the OS bootloader executes (e.g., a callback procedure). "Application" and "software" are considered broader terms than "firmware," and refer to machine-readable instructions that execute after the OS bootloader starts, through OS runtime, and until the electronic device shuts down.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component is omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
an image sensor; and
a controller to:
  receive multiple images from the image sensor including respective foregrounds and backgrounds;
  segment the respective foregrounds from the backgrounds;
  combine the backgrounds to form a fused background that includes image data from the multiple images; and
  perform an operational loop to:
    receive a new image including a new image foreground and a new image background;
    segment the new image foreground from the new image background, and
    synthesize an image for transmission including the new image foreground and the fused background.

2. The electronic device of claim 1, wherein the controller is to refine the fused background by combining the new image background with the fused background.

3. The electronic device of claim 2, wherein the image for transmission includes the new image foreground and a blurred representation of the fused background.

4. The device of claim 1, wherein the multiple images correspond to different times.

5. The device of claim 4, wherein the respective foregrounds of the multiple images correspond to a subject, and wherein the subject is in different positions at the different times.

6. The device of claim 1, wherein a greater percentage of a background environment is visible in the fused background than is visible in the respective backgrounds of the multiple images.

7. The electronic device of claim 1, wherein the multiple images correspond to different image sensor viewpoints.

8. The electronic device of claim 7, wherein the controller is to combine the backgrounds to form the fused background by aligning the multiple images using image stitching.

9. The electronic device of claim 3, wherein the controller is to generate a video stream from a series of the synthesized images for transmission.

10. The electronic device of claim 9, wherein the video stream includes the image data from the multiple images and image data from the new image.

11. A non-transitory computer-readable medium storing machine-readable instructions which, when executed by a controller of an electronic device, cause the controller to:
receive first and second images including respective first and second foregrounds and first and second backgrounds;
combine the first and second backgrounds to form a first fused background that includes image data from the first and second images;
process the first fused background to blur the first fused background;
provide a first image for transmission including the second foreground and the blurred first fused background; and
perform an operational loop to:
receive a third image including a third foreground and a third background; and
provide a second image for transmission including the third foreground.

12. The computer-readable medium of claim 11, wherein execution of the executable code causes the controller to, in the operational loop:
combine the first fused background and the third background to form a second fused background; and
process the second fused background to blur the second fused background;
wherein the image for transmission-including the third foreground and the blurred second fused background.

13. The computer-readable medium of claim 11, wherein the second image is taken at a time subsequent to the first image.

14. The computer-readable medium of claim 13, wherein the first fused background includes data not present in at least one of the first background or the second background.

15. The computer-readable medium of claim 11, wherein execution of the executable code causes the controller to provide the first image for transmission by synthesizing the first image for transmission by overlaying the second foreground over the first blurred first fused background.

16. The computer-readable medium of claim 11, wherein the first and second images correspond to respective first and second camera viewpoints.

17. The computer-readable medium of claim 16, wherein execution of the executable code causes the controller to combine the first and second backgrounds by applying a stitching matrix to the first and second images.

18. The computer-readable medium of claim 11, wherein the first image for transmission includes image data from the first and second images.

19. The computer-readable medium of claim 18, wherein the first image for transmission includes the image data from the first image in both the second foreground and the blurred fused background, and includes the image data from the second image in the blurred fused background.

20. The computer-readable medium of claim 11, wherein execution of the executable code causes the controller to generate a video stream including the first image for transmission and a series of the second images for transmission.

* * * * *